United States Patent
Ren et al.

(10) Patent No.: US 12,274,282 B2
(45) Date of Patent: Apr. 15, 2025

(54) OXYGEN REMOVAL MODULE, FRESH-KEEPING DEVICE AND REFRIGERATOR

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Xianghua Ren, Hefei (CN); Zhijie Ren, Hefei (CN); Weihao Xie, Hefei (CN); Xiaolong Yuan, Hefei (CN); Yunbin Liu, Hefei (CN); Qipeng Shao, Hefei (CN); Xin Zhou, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 406 days.

(21) Appl. No.: 17/801,788

(22) PCT Filed: Dec. 23, 2020

(86) PCT No.: PCT/CN2020/138713
§ 371 (c)(1),
(2) Date: Aug. 23, 2022

(87) PCT Pub. No.: WO2021/190007
PCT Pub. Date: Sep. 30, 2021

(65) Prior Publication Data
US 2023/0108252 A1 Apr. 6, 2023

(30) Foreign Application Priority Data
Mar. 24, 2020 (CN) .......................... 202010211484.X

(51) Int. Cl.
*A23L 3/3418* (2006.01)
*A23B 7/148* (2006.01)
(Continued)

(52) U.S. Cl.
CPC ............ *A23L 3/3418* (2013.01); *A23B 7/148* (2013.01); *B01D 53/326* (2013.01);
(Continued)

(58) Field of Classification Search
None
See application file for complete search history.

(56) References Cited

FOREIGN PATENT DOCUMENTS

| CN | 105042983 A | 11/2015 |
| CN | 107062744 A | 8/2017 |

(Continued)

OTHER PUBLICATIONS

CN-107782040-A English Machine Translation (Year: 2018).*
(Continued)

*Primary Examiner* — Jenna M Maroney

(57) ABSTRACT

An oxygen removal module, a fresh-keeping device and a refrigerator. The oxygen removal module comprises: an electrolyte tank provided with a water inlet; and a water tank provided with a water outlet, the water outlet being connected to the water inlet through a first pipeline, to supplement water to the electrolyte tank by means of the water tank.

17 Claims, 8 Drawing Sheets

(51) Int. Cl.
  *B01D 53/32* (2006.01)
  *F25D 17/04* (2006.01)
  *F25D 25/02* (2006.01)

(52) U.S. Cl.
  CPC ......... *F25D 17/042* (2013.01); *F25D 25/025* (2013.01); *A23V 2002/00* (2013.01); *F25D 2317/04* (2013.01)

(56) References Cited

FOREIGN PATENT DOCUMENTS

| | | | | | |
|---|---|---|---|---|---|
| CN | 107270624 | A | | 10/2017 | |
| CN | 107782040 | A | * | 3/2018 | ............. F25D 11/02 |
| CN | 108332480 | A | | 7/2018 | |
| CN | 109855378 | A | | 6/2019 | |
| CN | 211695579 | U | | 10/2020 | |
| CN | 113446794 | A | * | 9/2021 | |
| CN | 113446797 | A | * | 9/2021 | |
| CN | 214630987 | U | * | 11/2021 | ............. A47B 71/00 |
| CN | 215125974 | U | * | 12/2021 | |
| DE | 102017210786 | A1 | | 12/2018 | |
| JP | S5647577 | A | | 4/1981 | |
| JP | H0967689 | A | | 3/1997 | |
| JP | H09287869 | A | | 11/1997 | |
| JP | 2002039413 | A | | 2/2002 | |
| JP | 2014009860 | A | * | 1/2014 | |
| JP | 2014020722 | A | | 2/2014 | |
| JP | 2015017765 | A | | 1/2015 | |
| JP | 2015094553 | A | * | 5/2015 | |
| JP | 2016080241 | A | | 5/2016 | |
| JP | 2016161176 | A | | 9/2016 | |
| JP | 6013046 | B2 | * | 10/2016 | |
| JP | 6071292 | B2 | * | 2/2017 | ........... A23L 3/3445 |
| JP | 6242586 | B2 | * | 12/2017 | |
| JP | 2019002061 | A | | 1/2019 | |
| KR | 20140002472 | A | * | 1/2014 | |
| KR | 20140026247 | A | * | 3/2014 | |
| WO | WO-03087434 | A1 | * | 10/2003 | ........... B01D 53/326 |
| WO | 2013054433 | A1 | | 4/2013 | |
| WO | 2014014021 | A1 | | 1/2014 | |
| WO | 2017043433 | A1 | | 3/2017 | |

OTHER PUBLICATIONS

JP-2015094553-A English Machine Translation (Year: 2015).*
First Office Action received in JP Patent Application No. 2022-545151; mailed Jun. 20, 2023.
EESR received in EP Application No. 20926657.6; mailed Jul. 21, 2023.
International Search Report mailed Mar. 22, 2021 for PCT/CN2020/138713.
Written Opinion issued by ISA mailed Mar. 22, 2021 for PCT/CN2020/138713.
First OA mailed Mar. 30, 2022 for CN Application No. 202010211484.X.
Notification to Grant Patent Right mailed Apr. 26, 2022 for CN Application No. 202010211484.X.

* cited by examiner

OXYGEN REMOVAL MODULE, FRESH-KEEPING DEVICE AND REFRIGERATOR

CROSS-REFERENCES TO RELATED APPLICATIONS

The present disclosure is a national phase application of International Application No. PCT/CN2020/138713, filed on Dec. 23, 2020, which claims priority to Chinese Application No. 202010211484.X, filed on Mar. 24, 2020, the entireties of which are herein incorporated by reference.

FIELD

The present disclosure relates to the field of refrigeration, and more particularly, to an oxygen removal module, a fresh-keeping device and a refrigerator.

BACKGROUND

Oxygen removal module has been used in refrigeration and preservation devices such as refrigerators, and is capable of consuming oxygen in a storage space, thus forming an environment with low oxygen in the storage space. The low oxygen environment can effectively inhibit respiration of fruits and vegetables, thus reducing the consumption of organic substances; and can also make cells of the fruits and vegetables breathe slowly, thus maintaining the vitality of the cells, and keeping the excellent flavor and aroma of the fruits and vegetables. The low oxygen environment can also inhibit the activity of some enzymes and the production of ethylene, thus delaying ripening and senescence processes, and the nutrition and freshness of fruits can be remained for a long time. In addition, the low oxygen environment can also effectively inhibit the breeding of aerobic bacteria, thus preventing the spoilage of the fruits and vegetables.

The oxygen removal module includes an anode, a cathode and an electrolyte tank. The electrolyte tank stores an electrolyte used for reaction, and the cathode is contacted with air in the storage space. During operation, the cathode consumes oxygen in the storage space, and the anode produces oxygen, when the oxygen escapes, water may be taken away, resulting in the reduction of a water amount in the electrolyte tank. Thus, after a long-term operation, the electrolyte tank will be faced with water shortage.

SUMMARY

The present disclosure aims to solve at least one of the problems in the prior art. Therefore, in one aspect, the present disclosure provides an oxygen removal module, in which a water tank capable of meeting a service cycle and supplementing water for the oxygen removal module is adopted, and thus the defect of water shortage in the electrolyte tank is solved, even after a long-term operation of the oxygen removal module.

In another aspect, the present disclosure further provides a fresh-keeping device with the said oxygen removal module.

In yet another aspect, the present disclosure further provides a refrigerator with the said fresh-keeping device.

An oxygen removal module according to an embodiment in a first aspect of the present disclosure includes: an electrolyte tank provided with a water inlet; and a water tank provided with a water outlet, and the water outlet is connected to the water inlet, to supplement water to the electrolyte tank through the water tank.

The oxygen removal module according to the embodiment of the present disclosure at least has the following beneficial effects: the water tank is provided to connect with the electrolyte tank and water in the water tank can be injected into the electrolyte tank, and a liquid level in the electrolyte tank will be maintained in a normal range. Since the water tank has a predetermined volume to pre-store water for the oxygen removal module to serve a longer, thus solving a problem of water supplementation of the oxygen removal module in the prior art. Thus, the defect of water shortage in the electrolyte tank is solved, even after a long-term operation of the oxygen removal module.

According to some embodiments of the present disclosure, the electrolyte tank is provided with a first air pressure balance port, the water tank is provided with a second air pressure balance port, and the first air pressure balance port is connected to the second air pressure balance port, to keep air pressures in the water tank and the electrolyte tank balanced.

According to some embodiments of the present disclosure, the water outlet is connected to the water inlet through a pipeline, and the first air pressure balance port is connected to the second air pressure balance port through a pipeline.

According to some embodiments of the present disclosure, the water tank is provided with a water feeding port, and a sealing structure capable of plugging the water feeding port is mounted on the water feeding port.

According to some embodiments of the present disclosure, the electrolyte tank is provided with an oxygen exhaust hole, and the exhaust hole is provided with an anti-toppling leakage structure.

According to some embodiments of the present disclosure, the anti-toppling leakage structure includes: an exhaust passage arranged in the electrolyte tank along a vertical direction, where one end of the exhaust passage is connected to the exhaust hole, and the other end of the exhaust passage is communicated with the electrolyte tank; a floating ball arranged in the exhaust passage, where a gap is formed between the floating ball and the exhaust passage, a diameter of the floating ball is larger than an inner diameter of the exhaust hole and the floating ball is capable of blocking the exhaust hole; and a stopping portion arranged at the end of the exhaust passage communicating with the electrolyte tank, to prevent the floating ball from falling from the exhaust passage.

According to some embodiments of the present disclosure, an inner wall of the exhaust passage is provided with exhaust grooves along an axial direction.

According to some embodiments of the present disclosure, the end of the exhaust passage connected with the exhaust hole is arranged in an arc shape matched with a correspondingly contacted spherical surface of the floating ball.

According to some embodiments of the present disclosure, a diameter of the exhaust passage is gradually reduced from bottom to top.

According to some embodiments of the present disclosure, a top portion of the electrolyte tank is provided with a pressure release valve.

A fresh-keeping device according to an embodiment in a second aspect of the present disclosure includes: a frame provided with an accommodating space, where one side of the frame is provided with an opening, a wall of the frame is provided with a vent hole, and the vent hole is communicated with the accommodating space; a drawer accessible and containable in the accommodating space through the opening, to form a closed storage space with the frame; and any one of oxygen removal modules above, where the electrolyte tank of the oxygen removal module is arranged at the vent hole of the frame, to consume oxygen inside the storage space, thus reducing an oxygen content in the storage space.

The fresh-keeping device according to the embodiment of the present disclosure at least has the following beneficial effects: the fresh-keeping device provided by the present disclosure includes the oxygen removal module according to any one of the embodiments above, thus having all the beneficial effects of the oxygen removal module according to any one of the embodiments, which will not be exemplified herein.

According to some embodiments of the present disclosure, the frame includes: an inner frame, where the accommodating space is arranged within the inner frame, the opening is arranged on one side of the inner frame, the vent hole is arranged in a side wall of the inner frame far away from the opening, and the water tank is arranged at an upper side wall of the inner frame; and an outer frame arranged on the inner frame, where the electrolyte tank is arranged between the inner frame and the outer frame.

According to some embodiments of the present disclosure, the electrolyte tank is detachably arranged on the inner frame through a first fixing structure, and the water tank is detachably arranged on the inner frame through a second fixing structure.

According to some embodiments of the present disclosure, the first fixing structure includes: a first connecting column arranged on the side wall of the inner frame, where a first connecting hole is arranged in the first connecting column; a first stepped hole arranged at a corresponding position of the electrolyte tank, where the first connecting column passes through the first stepped hole; and a first fixed connecting member passing through the first stepped hole and threadedly connected to the first connecting hole.

According to some embodiments of the present disclosure, the second fixing structure includes: a second connecting column arranged on the upper side wall of the inner frame, where a second connecting hole is arranged in the second connecting column; a second stepped hole arranged at a corresponding position of the water tank, where the second connecting column passes through the second stepped hole; and a second fixed connecting member passing through the second stepped hole and threadedly connected to the second connecting hole.

According to some embodiments of the present disclosure, a sealing strip is arranged between the opening and the drawer, to ensure a sealing performance between the opening and the drawer.

According to some embodiments of the present disclosure, vent holes are provided, and vent holes are arranged on the side wall of the frame in an array.

A refrigerator according to an embodiment in a third aspect of the present disclosure includes the fresh-keeping device according to any one of the embodiments above.

The refrigerator according to the embodiment of the present disclosure at least has the following beneficial effects: the refrigerator provided by the present disclosure includes the oxygen removal module according to any one of the embodiments above, thus having all the beneficial effects of the oxygen removal module according to any one of the embodiments above, which will not be exemplified herein.

Some of the additional aspects and advantages of the present disclosure will be explained in the following description, which can become apparent from the following description or be understood through practice of the present disclosure.

BRIEF DESCRIPTION OF THE DRAWINGS

The above and/or additional aspects and advantages of the present disclosure will become apparent and easy to understand from the description of embodiments in conjunction with the following drawings, where.

REFERENCE NUMERALS

Figure 1:
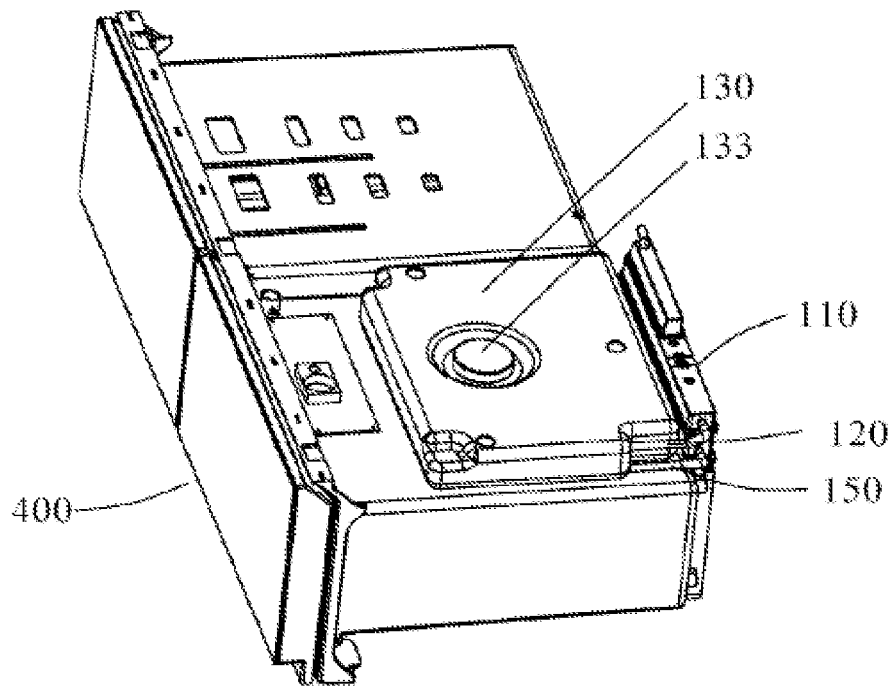
FIG. 1 is a stereoscopic schematic diagram of an oxygen removal module assembled on a fresh-keeping device according to an embodiment of the present disclosure.

| 100: oxygen removal module; | 110: electrolyte tank; |
| --- | --- |
| 111: water inlet; | 112: first air pressure balance port; |
| 113: upper cover; | 120: first pipeline; |
| 130: water tank; | 131: water outlet; |
| 132: second air pressure balance port; | 133: water tank cover; |
| 140: exhaust hole; | 150: second pipeline; |
| 160: pressure release valve; | 170: electric control board; |
| 300: anti-toppling leakage structure; | 310: exhaust passage; |
| 311: exhaust groove; | 320: floating ball; |
| 330: stopping portion; | |
| 400: fresh-keeping device; | 410: frame; |

-continued

411: accommodating space;
413: vent hole;
415: outer frame;
421: end cover;
500: first fixing structure;
511: first connecting hole;
521: first larger hole;
523: first guide surface;
600: second fixing structure;
611: second connecting hole;
200: refrigerator.

412: opening;
414: inner frame;
420: drawer;
422: sealing strip;
510: first connecting column;
520: first stepped hole;
522: first smaller hole;

610: second connecting column;
620: second stepped hole;

DETAILED DESCRIPTION OF THE DISCLOSURE

Embodiments of the present disclosure are described below in detail, illustrations of which are shown in the accompanying drawings, where identical or similar reference numerals denote identical or similar elements or elements having the same or similar functions. The embodiments described below by reference to the accompanying drawings are exemplary and are intended only to explain the present disclosure and are not to be construed as limiting the present disclosure.

In the description of the present disclosure, it should be understood that any orientation/position related description, such as the orientational or positional relationship, such as, up, down, front, rear, left, right, and the like, is based on the orientational or positional relationship shown in the accompanying drawings, is only for the purpose of facilitating the description of the present disclosure and simplifying the description, and does not indicate or imply that the device or element must have a specific orientation or position, be constructed and operated in a specific orientation or position, and therefore shall not be understood as a limitation to the present disclosure.

In the description of the present disclosure, if there are terms, such as "first" and "second", there are only for the purpose of distinguishing features, and shall not be understood as indicating or implying relative importance or implying the number of indicated features or implying the order of indicated features.

In the description of the present disclosure, words such as arrangement, installation, and connection shall be understood in a broad sense unless otherwise specified. The specific meaning of the above words in the present disclosure with reference to the context of the disclosure.

Figure 15:
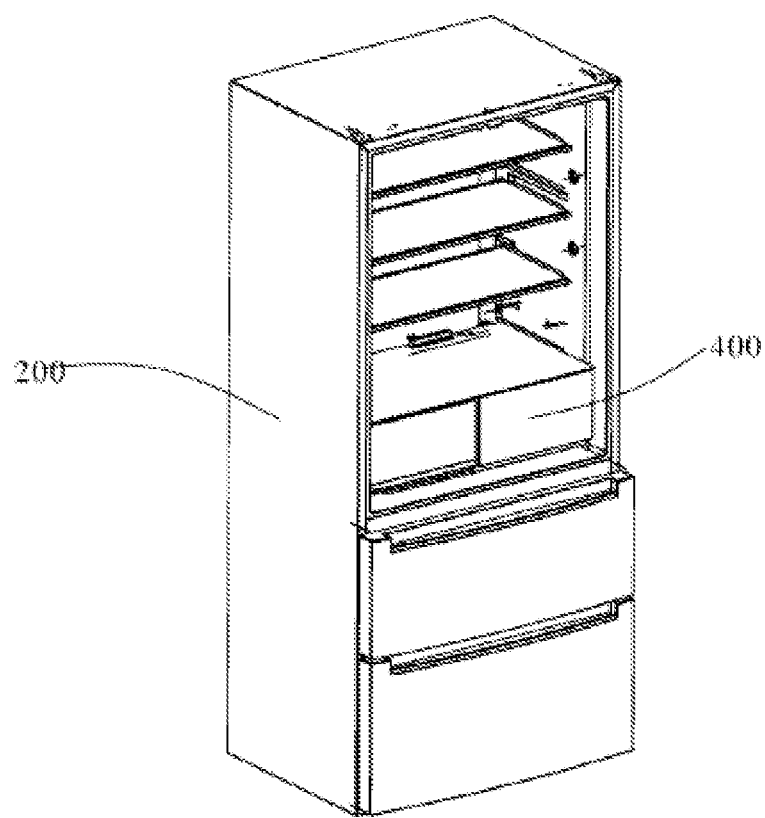
FIG. 15 is a stereoscopic schematic diagram of a refrigerator according to an embodiment of the present disclosure.

As shown in FIG. 15, an oxygen removal module 100 in a first aspect of the present disclosure is used in a refrigerator for removing oxygen and retaining freshness. The refrigerator 200 may refer to a refrigeration storage device in a broad sense, such as an electric refrigerator, an electric freezer, and a refrigerated cabinet, and so on.

Figure 2:
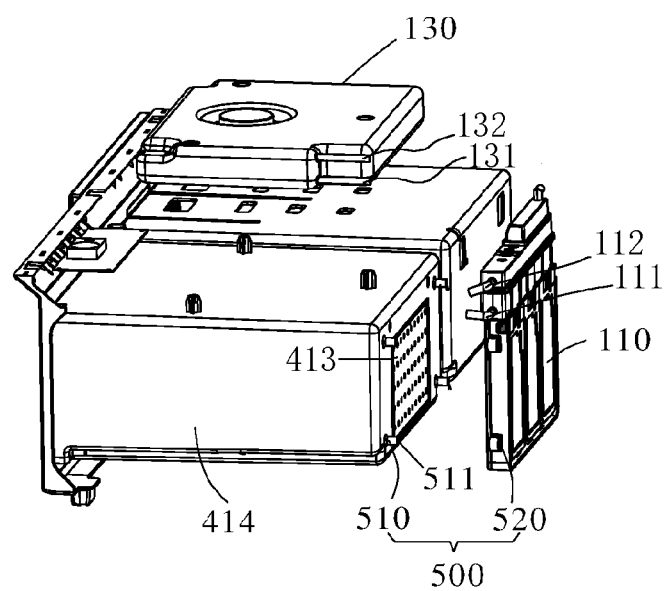
FIG. 2 is a stereoscopic exploded view of the oxygen removal module assembled on the fresh-keeping device according to an embodiment of the present disclosure.

With reference to FIG. 1 and FIG. 2, the oxygen removal module 100 according to the embodiments of the present disclosure includes an electrolyte tank 110 and a water tank 130. The electrolyte tank 110 is used for storing an electrolyte. The electrolyte tank 110 is provided with a water inlet 111, and the water inlet 111 is communicated with an inner cavity of the electrolyte tank 110. The water tank 130 is provided with a water outlet 131, the water outlet 131 is arranged at a position near to a bottom portion of the water tank 130. And the water outlet 131 is communicated with an inner cavity of the water tank 130. The water outlet 131 is connected to the water inlet 111 through a first pipeline 120, and the water tank can supplement water to the electrolyte tank 110.

It can be understood that, in order to supplement water to the electrolyte tank 110 through the water outlet 131 and the water inlet 111, the water outlet 131 has a height higher than that of the water inlet 111. In another embodiment, under a condition that a difference between a liquid level of the water tank 130 and the height of the water inlet 111 is larger than a height difference between the water outlet 131 and the water inlet 111, the height of the water outlet 131 may also be set to be lower than that of the water inlet 111, to supplement water to the electrolyte tank 110 through a water pressure.

A cathode electrode and an anode electrode (not shown in the drawings) are arranged inside the oxygen removal module 100. The cathode electrode is contacted with air through a waterproof air-permeable film. An operating principle of the oxygen removal module 100 is that: oxygen in air permeates through the waterproof air-permeable film to enter the electrolyte tank 110, while nitrogen in air is blocked outside the electrolyte tank 110 by the waterproof air-permeable film at the same time, and the oxygen will have an electrochemical reaction with water under an action of the cathode to produce hydroxide ions. Meanwhile, an electrochemical reaction occurs at the anode, and the hydroxide ions subjected to the reaction produce water and oxygen, to replace the oxygen in air and exhaust the oxygen out of the oxygen removal module 100 through an exhaust hole 140, thus reducing an oxygen content in a drawer, and then achieving a fresh-keeping effect.

During operation of the oxygen removal module 100, a part of water may be taken away by the exhausted oxygen, and water in the electrolyte in the electrolyte tank 110 is gradually reduced, thus affecting normal operation of the oxygen removal module 100. Therefore, it is necessary for a customer to supplement water regularly. When the oxygen removal module 100 according to the embodiment of the present disclosure is used, since the water tank 130 has a predetermined volume, the water tank 130 may be added with enough water to cover a long use cycle of the oxygen removal module 100. The water in the water tank 130 may be supplemented to the electrolyte tank 110 through the first pipeline 120, and a liquid level in the electrolyte tank 110 is maintained in a normal range, thus solving a problem of water supplementation of the oxygen removal module. Thus, the defect of water shortage in the electrolyte tank 110 is solved, even after a long term operation of the oxygen removal module 100.

With reference to FIG. 1 and FIG. 2, in some embodiments of the present disclosure, the electrolyte tank 110 is provided with a first air pressure balance port 112, and the first air pressure balance port 112 is communicated with a space above an electrolyte level in the inner cavity of the electrolyte tank 110. The water tank 130 is provided with a second air pressure balance port 132, and the second air pressure balance port 132 is communicated with a space above a liquid level in the water tank 130. The first air pressure balance port 112 is connected to the second air pressure balance port 132 through a second pipeline 150, to keep air pressures in the water tank 130 and the electrolyte tank 110 balanced.

A large pressure may be produced if gas produced by the oxygen removal module 100 cannot be exhausted in time, and an electrolytic film of the oxygen removal module 100 may be destroyed, and the water in the water tank 130 may be unable to flow into the electrolyte tank 110 smoothly.

Therefore, in the embodiment, the air pressure balance ports are arranged in the electrolyte tank 110 and the water tank 130 with a pipeline connected in between, to realize air pressure balance between the water tank 130 and the electrolyte tank 110, thus preventing the electrolytic film of the oxygen removal module 100 from being destroyed, protecting the oxygen removal module 100, and being convenient for the water in the water tank 130 to smoothly enter the electrolyte tank 110 at the same time.

As shown in FIG. 1 and FIG. 2, in some embodiments, the first air pressure balance port 112 is located above the water inlet 111 and located in an upper portion of the electrolyte level, and the second air pressure balance port 132 is located above the water outlet 131 and located in an upper portion of the liquid level in the water tank, to ensure communication between the space above the liquid level in the water tank 130 and the space above the electrolyte level in the inner cavity of the electrolyte tank 110, thus realizing air pressure balance between the water tank 130 and the electrolyte tank 110.

It can be understood that, in some embodiments, the first air pressure balance port 112 may be arranged in the electrolyte tank 110 below the electrolyte level, an interior of the electrolyte tank 110 is connected to the first air pressure balance port 112 through a pipeline, and an outlet of the pipeline is arranged above the electrolyte level. Similarly, the second air pressure balance port 132 may be arranged in the water tank 130 below the liquid level, an interior of the water tank 130 is connected to the second air pressure balance port 132 through a pipeline, and an outlet of the pipeline is higher than the liquid level in the water tank 130. In such an embodiment, the communication between the space above the liquid level in the water tank 130 and the space above the electrolyte level in the inner cavity of the electrolyte tank 110 is ensured, thus realizing air pressure balance between the water tank 130 and the electrolyte tank 110.

In some embodiments, the first pipeline 120 and the second pipeline 150 are flexible pipelines. The connection by the flexible pipelines facilitates separation between the water tank 130 and the oxygen removal module 100, and after the electrolyte tank 110 or the water tank 130 is damaged, the electrolyte tank 110 or the water tank 130 may be replaced separately, thus reducing a maintenance cost.

With reference to FIG. 1 and FIG. 2, in some embodiments, the water tank 130 is provided with a water feeding port (not shown in the drawings), and a sealing structure capable of plugging the water feeding port is mounted on the water feeding port, and it is convenient for water feeding during production. And it is convenient for a customer to add water to the water tank 130 after the water in the water tank 130 is used up.

As shown in FIG. 1 and FIG. 2, in some embodiments, the sealing structure may be a water tank cover 133 arranged on the water feeding port, the water tank cover 133 is connected to the water feeding port through a thread, and a leakage-proof gasket (not shown in the drawings) is mounted in the water tank cover 133, to prevent water evaporation or leakage.

In some embodiments, the water tank cover 133 may also be connected to the water feeding port in a known way, such as snap-fit connection, which will not be described in detail herein.

It can be understood that, the sealing structure may also be a valve connected to the water feeding port through a pipeline. The valve may be a one-way valve, a stop valve and the like.

Figure 3:
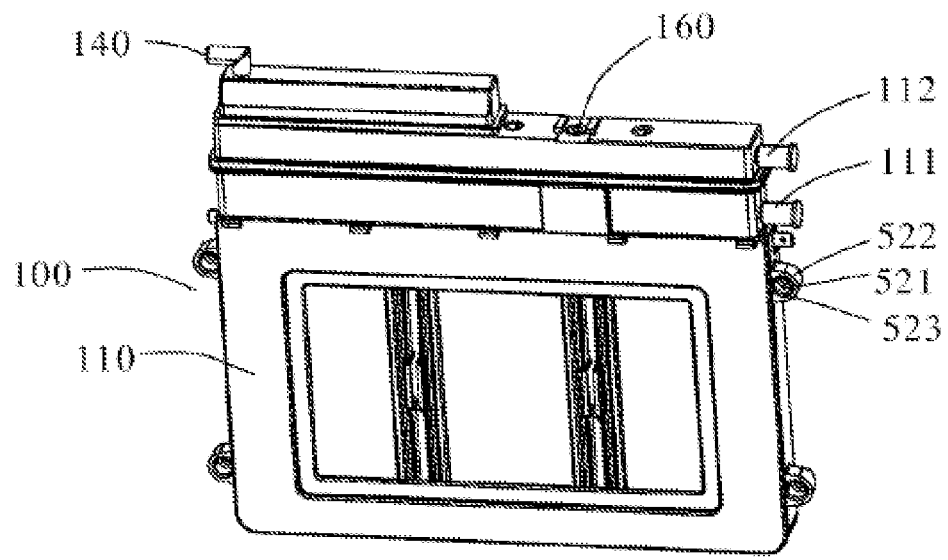
FIG. 3 is a stereoscopic schematic diagram of the oxygen removal module according to an embodiment of the present disclosure, and the water tank is removed.
Figure 4:
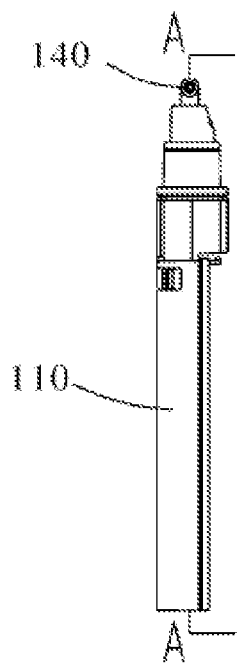
FIG. 4 is a left-side view of FIG. 3.
Figure 5:
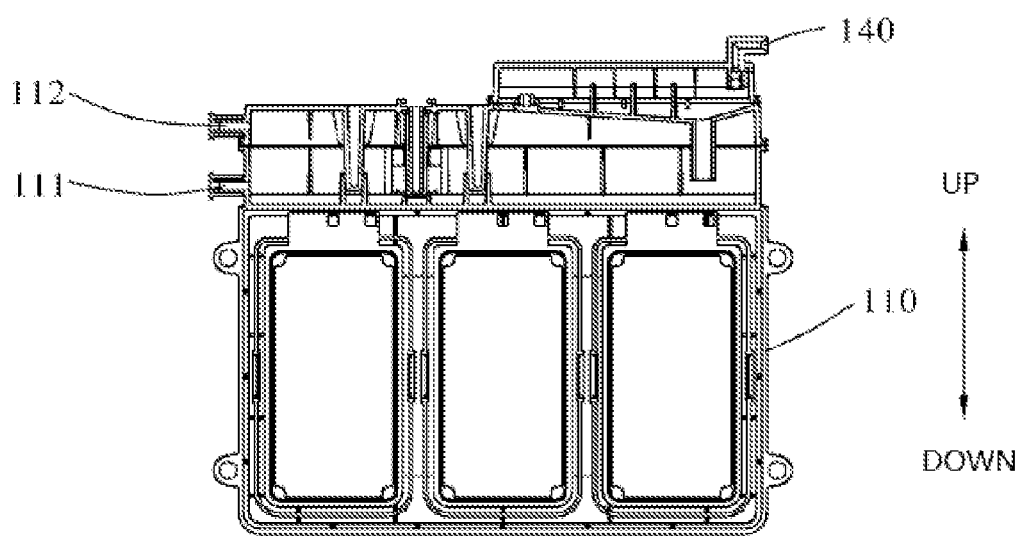
FIG. 5 is a cross-sectional view of an A-A direction in FIG. 4.

With reference to FIG. 3, FIG. 4 and FIG. 5, in some embodiments, the electrolyte tank 110 is provided with an oxygen exhaust hole 140, and after the oxygen removal module 100 replaces the oxygen from air, the oxygen may be exhausted through the exhaust hole 140, to maintain the air pressure in the electrolyte tank 110 in a normal state. The exhaust hole 140 is provided with an anti-toppling leakage structure 300, which may prevent the electrolyte of the oxygen removal module 100 from leaking when the refrigerator 200 topples during transportation, thus preventing the refrigerator 200 from being corroded by the leaked electrolyte.

With reference to FIG. 6 to FIG. 12, in some embodiments, the anti-toppling leakage structure 300 includes an exhaust passage 310, a floating ball 320 and a stopping portion 330. The exhaust passage 310 is arranged in the electrolyte tank 110 along a vertical direction, where one end of the exhaust passage 310 is connected to the exhaust hole 140, and the other end of the exhaust passage is communicated with the electrolyte tank 110. The floating ball 320 is arranged in the exhaust passage 310, where a gap is formed between the floating ball 320 and the exhaust passage 310. A diameter of the floating ball 320 is larger than an inner diameter of the exhaust hole 140, and the floating ball 320 is capable of blocking the exhaust hole 140. The stopping portion 330 is arranged at the end of the exhaust passage 310 communicated with the electrolyte tank 110, to prevent the floating ball 320 from falling from the exhaust passage 310.

It can be understood that, in some embodiments, in order to meet a requirement that the floating ball 320 is capable of blocking the exhaust hole 140 in the case of toppling of the oxygen removal module 110, it is necessary to consider a relationship between a gravity of the floating ball, a buoyancy of the electrolyte to the floating ball and a surface tension of the electrolyte to the floating ball. Experiments have proved that, materials simultaneously meeting conditions that a density of the floating ball is less than $1.3 \times 10^3$ kg/m$^3$, a radius of the floating ball is greater than 4 mm and there is no reaction with the electrolyte may all be used as materials of the floating ball, such as a PP material.

Figure 11:
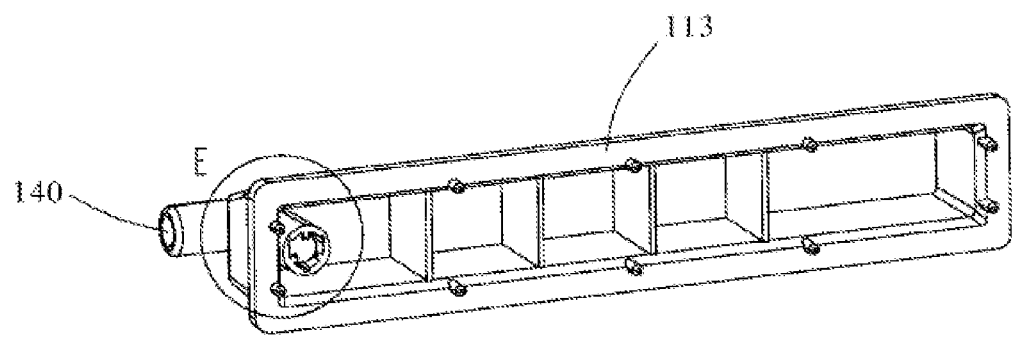
FIG. 11 is a stereoscopic schematic diagram of an upper cover of the oxygen removal module according to an embodiment of the present disclosure.
Figure 12:
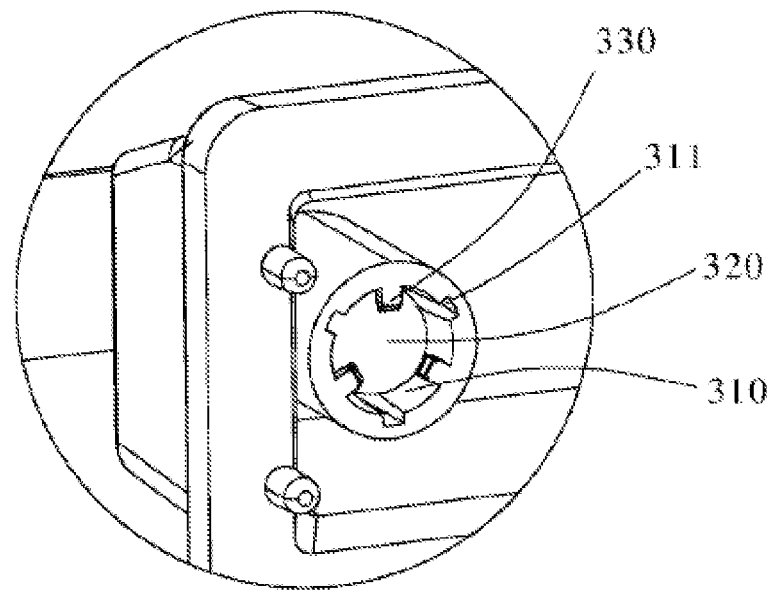
FIG. 12 is an enlarged view of a portion referred by E in FIG. 10.

As shown in FIG. 11 and FIG. 12, in some embodiments, the stopping portion 330 is three stopping ribs extending along a radial direction of the exhaust passage 310 to an axial direction of the exhaust passage 310. The three stopping ribs are uniformly arranged on an inner circumference of the exhaust passage 310, and the stopping ribs are integrally formed with the exhaust passage 310. In some embodiments, one, two or more stopping ribs may also be provided, and the stopping portion 330 may also be separately arranged from the exhaust passage 310, and fixed on the exhaust passage 310 through a fixing member, which may also achieve the purpose of preventing the floating ball from falling from the exhaust passage.

Figure 6:
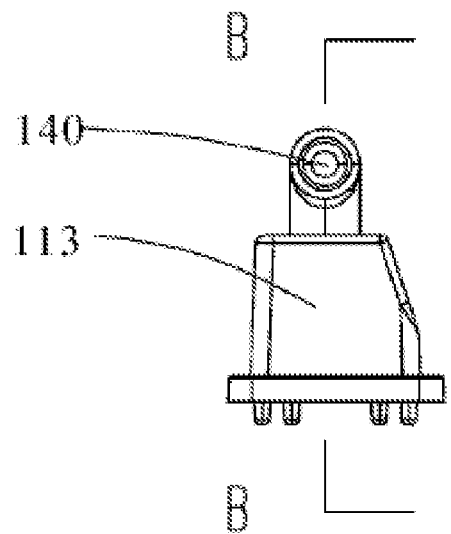
FIG. 6 is a schematic diagram of an anti-toppling leakage structure in the case of normal operation of the oxygen removal module according to an embodiment of the present disclosure.
Figure 7:
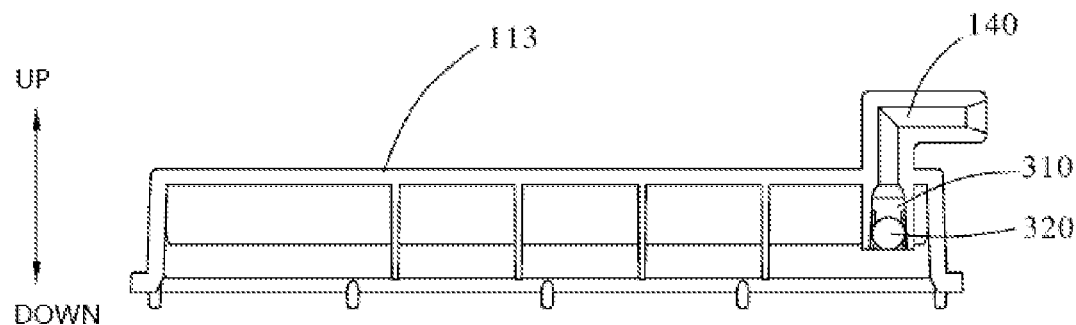
FIG. 7 is a cross-sectional view of a B-B direction in FIG. 6.

FIG. 6 and FIG. 7 show a schematic structural diagram of the anti-toppling leakage structure in the embodiment above in the case of normal operation of the oxygen removal module. As shown in the drawings, the electrolyte tank 110 is provided with an upper cover 113, and the exhaust hole 140 is arranged in the upper cover 113. The floating ball 320 falls on the stopping portion 330 under the gravity of the floating ball itself. And the oxygen is exhausted out of the oxygen removal module 100 through the gap between the floating ball 320 and the exhaust passage 310.

Figure 8:
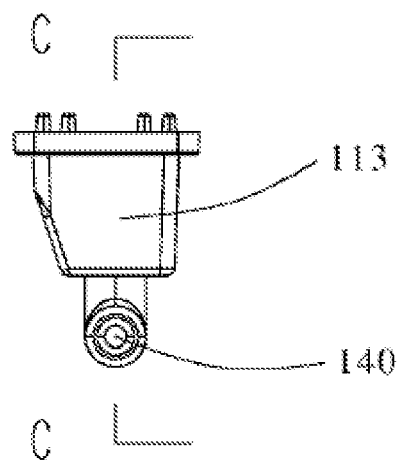
FIG. 8 is a schematic diagram of the anti-toppling leakage structure in the case of inverse arrangement of the oxygen removal module according to an embodiment of the present disclosure.
Figure 9:
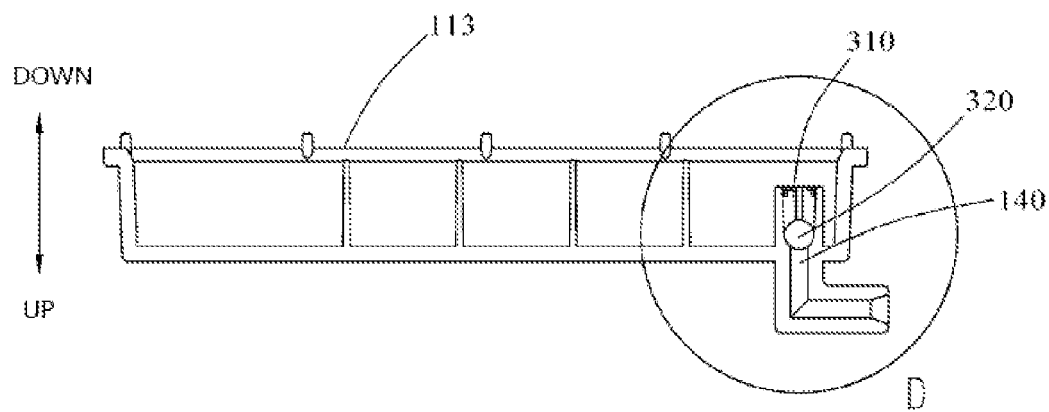
FIG. 9 is a cross-sectional view of a C-C direction in FIG. 8.
Figure 10:
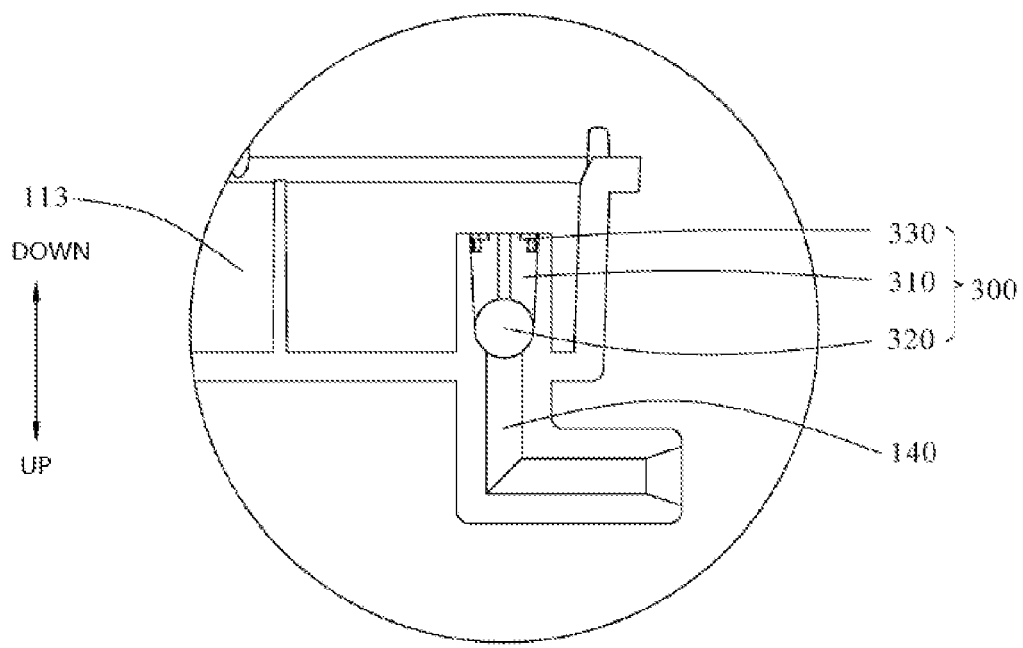
FIG. 10 is an enlarged view of a portion referred by D in FIG. 9.

FIG. 8, FIG. 9 and FIG. 10 show a schematic structural diagram of the anti-toppling leakage structure in the case of inverse arrangement of the oxygen removal module. As shown in the drawings, when the refrigerator 200 or the oxygen removal module 100 topples during transportation or conveying, the floating ball 320 blocks the exhaust hole 140 under the gravity of the floating ball itself and a pressure of a solution, to prevent the solution from leaking out of the module.

With reference to FIG. 11 and FIG. 12, in some embodiments, an inner wall of the exhaust passage 310 is provided with three exhaust grooves 311 along an axial direction. And one of the main purposes of the exhaust grooves 311 is used to increase the gas exhaust passage after the floating ball 320 falls on the stopping portion 330, thus increasing an exhaust amount. One end of each of the exhaust grooves 311 is communicated with the electrolyte tank 110, and lengths of the exhaust grooves 311 are shorter than that of the exhaust passage 310, to prevent the electrolyte from leaking out of the module from the exhaust grooves 311 when the floating ball 320 blocks the exhaust hole 140.

In some embodiments, one, two or more exhaust grooves 311 may also be provided according to an actual situation.

With reference to FIG. 7, FIG. 9 and FIG. 10, in some embodiments, the end of the exhaust passage 310 connected with the exhaust hole 140 is arranged in an arc shape matched with a correspondingly contacted spherical surface of the floating ball 320, to prevent a space between the floating ball 320 and the exhaust hole 140 when the floating ball 320 blocks the exhaust hole 140, thus improve a reliability of blocking the exhaust hole 140 by the floating ball 320.

With reference to FIG. 7, FIG. 9 and FIG. 10, in some embodiments, a diameter of the exhaust passage 310 is gradually reduced from bottom to top, and the floating ball 320 is capable of normally falling on the stopping portion when the oxygen removal module 100 is used, and it is convenient for the floating ball 320 to smoothly falling back to the stopping portion 330 when the oxygen removal module 100 is restored from a toppling state to a normal state.

It can be understood that, in some embodiments, the anti-toppling leakage structure 300 may also be a waterproof air-permeable film mounted in the exhaust hole 140 and other structures, which may also achieve the purpose of preventing the electrolyte of the oxygen removal module 100 from leaking and preventing the refrigerator from being corroded by the leaked electrolyte.

With reference to FIG. 3, in some embodiments, a top portion of the electrolyte tank 110 is provided with a pressure release valve 160. An opening pressure of the pressure release valve 160 may be set according to a safety pressure of the oxygen removal module 100. When the exhaust hole 140 of the oxygen removal module 100 is blocked and a pressure in the electrolyte tank 110 reaches the safety pressure of the oxygen removal module 100, the pressure release valve 160 is automatically opened to relieve the pressure, to prevent the oxygen removal module 100 from being damaged due to an excessively large pressure in the oxygen removal module 100.

Figure 13:
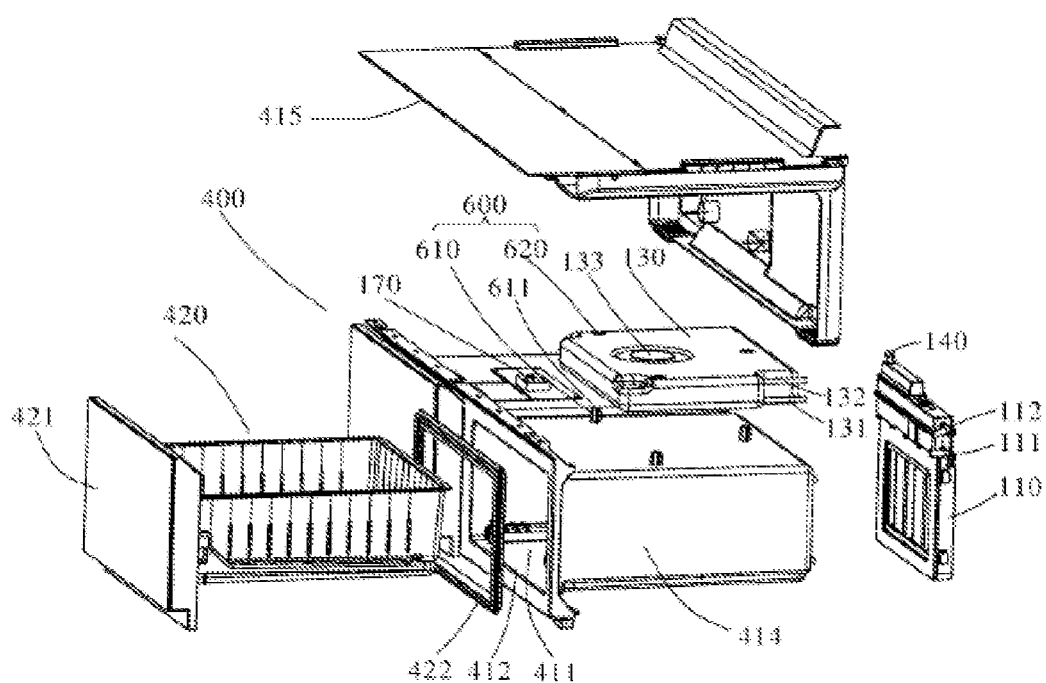
FIG. 13 is a stereoscopic exploded view of the fresh-keeping device according to an embodiment of the present disclosure.
Figure 14:
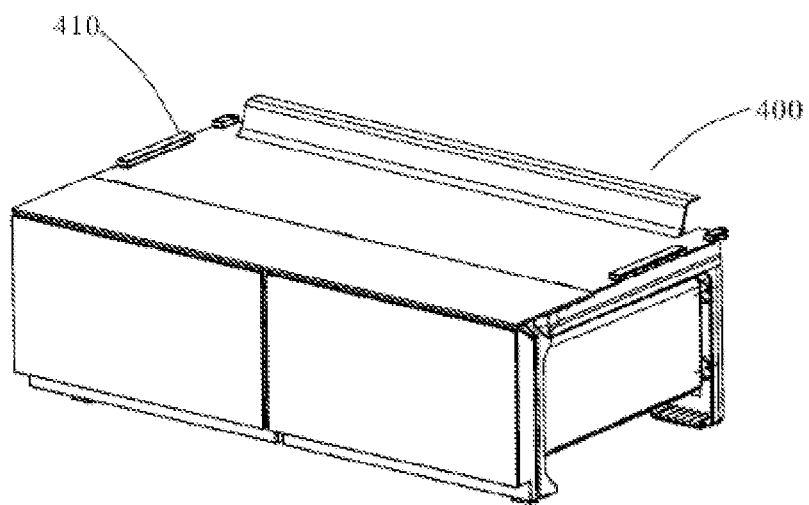
FIG. 14 is a stereoscopic schematic diagram of the fresh-keeping device according to an embodiment of the present disclosure.

With reference to FIG. 13 and FIG. 14, FIG. 13 and FIG. 14 show a fresh-keeping device 400 according to an embodiment in a second aspect of the present disclosure. The fresh-keeping device 400 shown in the drawings includes a frame 410, a drawer 420 and the oxygen removal module 100 provided by any one of the embodiments above.

As shown in the drawings, the frame 410 is provided with an accommodation space 411, where one side of the frame 410 is provided with an opening 412, a wall of the frame 410 is provided with a vent hole 413 (as shown in FIG. 2), and the vent hole 413 is communicated with the accommodating space 411. The drawer 420 is capable of accessing and being contained in the accommodating space 411 through the opening 412, to form a closed storage space with the frame 410. The electrolyte tank 110 of the oxygen removal module 100 is arranged at the vent hole 413 of the frame 410, the waterproof air-permeable film on the oxygen removal module 100 is opposite to the vent hole 413, and a sealing strip is arranged between the electrolyte tank 110 and the frame 410, to prevent air outside the fresh-keeping device 400 from entering the oxygen removal module 100. When the fresh-keeping device 400 is operated, oxygen in the accommodating space 411 may access the oxygen removal module 100 through the vent hole 413 in the frame 410, and the oxygen is replaced through the oxygen removal module 100, and then exhausted out of the oxygen removal module 100 through the exhaust hole 140 in the oxygen removal module 100, thus reducing an oxygen content inside the drawer 420, and then achieving a fresh-keeping effect.

The fresh-keeping device 400 provided by the embodiment of the present disclosure includes the oxygen removal module 100 provided by any one of the embodiments above. Therefore, the water in the water tank 130 may be supplemented to the electrolyte tank 110 through the first pipeline 120, and the liquid level in the electrolyte tank 110 is maintained in a normal range, thus solving a problem of water supplementation of the oxygen removal module. Thus, the defect of water shortage in the electrolyte tank 110 is solved, even after a long-term operation of the oxygen removal module 100.

With reference to FIG. 13, in some embodiments, the frame 410 includes an inner frame 414 and an outer frame 415. The outer frame 415 is arranged on the inner frame 414, where the accommodating space 411 is arranged in the inner frame 414, the opening 412 is arranged on one side of the inner frame 414, the vent hole 413 is arranged in a side wall of the inner frame 414 far away from the opening 412, and the water tank 130 is arranged on an upper side wall of the inner frame 414. The electrolyte tank 110 is arranged between the inner frame 414 and the outer frame 415, and a structure of the fresh-keeping device 400 is compact, thus improving an effective utilization space of the fresh-keeping device.

In some embodiments, the electrolyte tank 110 is detachably arranged on the inner frame 414 through a first fixing structure 500, and the water tank 130 is detachably arranged on the inner frame 414 through a second fixing structure 600, to facilitate maintenance of the oxygen removal module 100 and the fresh-keeping device 400.

As shown in FIG. 2 and FIG. 13, in some embodiments, the first fixing structure 500 includes a first connecting column 510, a first stepped hole 520 and a first fixed connecting member (not shown in the drawings).

As shown in the drawings, the first connecting column 510 is arranged on the side wall of the inner frame 414, the first connecting column 510 may be integrally formed with the inner frame 414 or separately arranged from the inner frame 414. When the first connecting column is separately arranged from the inner frame 414, the first connecting column 510 is fixed on the inner frame 414 through a fixing structure, such as a screw and a thread, and a first connecting hole 511 is formed in the first connecting column 510. The first stepped hole 520 is arranged at a corresponding position of the electrolyte tank 110, the first stepped hole 520 includes a first large hole 521 and a first small hole 522 with different diameters, the first large hole 521 is communicated with the first small hole 522. The first connecting column 510 is capable of being arranged in the first large hole 521.

The first fixed connecting member passes through the first small hole 522 and is threadedly connected to the first connecting hole 511.

It is foreseeable that, the first fixed connecting member may be a screw, a bolt, and other connecting members.

As shown in the drawings, in some embodiments, the second fixing structure 600 includes a second connecting column 610, a second stepped hole 620 and a second fixed connecting member (not shown in the drawings).

The second connecting column 610 is arranged on the upper side wall of the inner frame 414, the second connecting column may be integrally formed with the inner frame 414 or separately arranged from the inner frame 414. When the second connecting column is separately arranged from the inner frame 414, the second connecting column 610 is fixed on the inner frame 414 through a fixing structure, such as a screw and a thread, and a second connecting hole 611 is formed in the second connecting column 610. The second stepped hole 620 is arranged at a corresponding position of the water tank 130, the second stepped hole 620 includes a second large hole and a second small hole with different diameters (not shown in the drawings), the second large hole is communicated with the second small hole. The second connecting column 610 is capable of being arranged in the second large hole. The second fixed connecting member passes through the second small hole and is threadedly connected to the second connecting hole 611.

It is foreseeable that, the second fixed connecting member may be a screw, a bolt, and other connecting members.

It is foreseeable that, an end portion of the first stepped hole 520 is provided with a first guide surface 523, and an end portion of the second stepped hole 620 is provided with a second guide surface (not shown in the drawings), to facilitate insertion of the first connecting column 510 and the second connecting column 610 into the corresponding first stepped hole 520 and second stepped hole 620.

The electrolyte tank 110 is detachably arranged on the inner frame 414 through the first fixing structure above, and the water tank 130 is detachably arranged on the inner frame 414 through the second fixing structure above, to improve connection reliability between the electrolyte tank 110 and the inner frame 414 and between the water tank 130 and the inner frame 414, and realize simple, efficient and convenient assembly, thus reducing an assembly difficulty, and improving a system efficiency.

It can be understood that, the fixing structure may also be a structure of a screw or a bolt matched with a threaded hole directly, which will not be described in detail herein.

As shown in FIG. 13, in some embodiments, the sealing strip 422 is arranged between the opening 412 and the drawer 420, to ensure a sealing performance between the opening 412 and the drawer 420. The sealing strip 422 may be arranged on the inner frame 414, and a contour shape of an inner side of an end cover of the drawer 420 is adapted to a shape of the sealing strip 422. The sealing strip 422 may be selected from one of the following strip: modified polyvinyl chloride (PVC), vulcanized ethylene propylene diene monomer (EPDM) and thermoplastic ehylene propylene diene monomer (EPDM/PP) rubber strips. The sealing strip 422 may also be arranged on the inner side of the end cover 421 of the drawer 420, which facilitates sealing between the opening 412 of the frame and the drawer 420.

As shown in FIG. 2, in some embodiments, vent holes 413 are provided. The Vent holes 413 are arranged in the side wall of the frame in an array. Vent holes 413 can increase an oxygen transfer area between the accommodating space 411 and the oxygen removal module 100, thus improving an oxygen removal efficiency of the oxygen removal module 100.

It can be understood that, in order to realize a fresh-keeping function of the fresh-keeping device 400, it is necessary to supply electric energy to the oxygen removal module 100 of the fresh-keeping device 400. Therefore, the oxygen removal module 100 further includes an electric control board 170, the electric control board 170 may be mounted on the inner frame 414, and the electric control board 170 is electrically connected to the oxygen removal module 100. By setting a parameter of an oxygen content in the fresh-keeping device 400, the electric control board 170 may control switching on and off of the oxygen removal module 100, to control the oxygen content in the fresh-keeping device 400 in a set range. In addition, in order to automatically supplement water from the water tank 130 to the electrolyte tank 110, an electric control valve may be arranged on the first pipeline 120, and the electric control valve is electrically connected to the electric control board 170. When the liquid level in the electrolyte tank 110 reaches a predetermined position, the electric control board 170 controls the electric control valve to open, to supplement water to the electrolyte tank 110. When the liquid level in the electrolyte tank 110 is supplemented to the predetermined position, the electric control board 170 controls the electric control valve to close, to maintain the liquid level in the electrolyte tank 110 in a normal range.

With reference to FIG. 15, FIG. 15 shows a refrigerator 200 according to an embodiment in a third aspect of the present disclosure, which includes the fresh-keeping device 400 provided by any one of the embodiments above. The fresh-keeping device used in the refrigerator 200 provided by the present disclosure may supplement the water in the water tank 130 to the electrolyte tank 110 through the first pipeline 120, and the liquid level in the electrolyte tank 110 is maintained in a normal range, thus solving a problem of water supplementation of the oxygen removal module. Thus, the defect of water shortage in the electrolyte tank 110 is solved, even after a long-term operation of the oxygen removal module 100. Therefore, the oxygen removal module 100 is capable of being operated stably for a long time, and the fresh-keeping device 400 mounted in the refrigerator 200 obtains an environment with high nitrogen and low oxygen, which is beneficial for fresh keeping of food materials. The low oxygen environment can effectively inhibit respiration of fruits and vegetables, thus reducing the consumption of organic substances, and can also make cells of the fruits and vegetables breathe slowly, thus maintaining vitality of the cells, and keeping excellent flavor and aroma of the fruits and vegetables. The low oxygen environment can also effectively inhibit breeding of aerobic bacteria and anaerobic bacteria, thus preventing the fruits and vegetables from being spoiled by microorganisms. In addition, low oxygen can also inhibit activity of some enzymes and production of ethylene, thus delaying ripening and senescence processes, and nutrition and freshness of fruits can be remained for a long time.

What is claimed is:

1. An oxygen removal module used in a refrigerator, comprising:
   an electrolyte tank provided with a water inlet; and
   a water tank provided with a water outlet, and the water outlet is connected to the water inlet, such that water is supplemented to the electrolyte tank through the water tank;

wherein a top portion of the electrolyte tank is provided with a pressure release valve.

2. The oxygen removal module according to claim 1, wherein the electrolyte tank is provided with a first air pressure balance port, the water tank is provided with a second air pressure balance port, and the first air pressure balance port is connected to the second air pressure balance port, so as to keep air pressures in the water tank and the electrolyte tank balanced.

3. The oxygen removal module according to claim 2, wherein the water outlet is connected to the water inlet through a pipeline, and the first air pressure balance port is connected to the second air pressure balance port through a pipeline.

4. The oxygen removal module according to claim 1, wherein the water tank is provided with a water feeding port, and a sealing structure capable of plugging the water feeding port is mounted on the water feeding port.

5. The oxygen removal module according to claim 1, wherein the electrolyte tank is provided with an oxygen exhaust hole, and the exhaust hole is provided with an anti-toppling leakage structure.

6. The oxygen removal module according to claim 5, wherein the anti-toppling leakage structure comprises:
  an exhaust passage arranged in the electrolyte tank along a vertical direction, wherein one end of the exhaust passage is connected to the exhaust hole, and the other end of the exhaust passage is communicated with the electrolyte tank;
  a floating ball arranged in the exhaust passage, wherein a gap is formed between the floating ball and the exhaust passage, a diameter of the floating ball is larger than an inner diameter of the exhaust hole, and the floating ball is capable of blocking the exhaust hole; and
  a stopper arranged at the end of the exhaust passage communicated with the electrolyte tank, so as to prevent the floating ball from falling from the exhaust passage.

7. The oxygen removal module according to claim 6, wherein an inner wall of the exhaust passage is provided with a plurality of exhaust grooves along an axial direction.

8. The oxygen removal module according to claim 6, wherein the end of the exhaust passage connected with the exhaust hole is arranged in an arc shape matched with a correspondingly contacted spherical surface of the floating ball.

9. The oxygen removal module according to claim 6, wherein a diameter of the exhaust passage is gradually reduced from bottom to top.

10. A fresh-keeping device, comprising:
  a frame provided with an accommodating space, wherein one side of the frame is provided with an opening, a wall of the frame is provided with a vent hole, and the vent hole is communicated with the accommodating space;
  a drawer capable of accessing and containing in the accommodating space through the opening, so as to form a closed storage space with the frame; and
  the oxygen removal module according to claim 1, wherein the electrolyte tank is arranged at the vent hole, so as to consume oxygen inside the storage space through the oxygen removal module.

11. The fresh-keeping device according to claim 10, wherein the frame comprises:
  an inner frame, wherein the accommodating space is arranged in the inner frame, the opening is arranged on one side of the inner frame, the vent hole is arranged in a side wall of the inner frame far away from the opening, and the water tank is arranged at an upper side wall of the inner frame; and
  an outer frame arranged on the inner frame, wherein the electrolyte tank is arranged between the inner frame and the outer frame.

12. The fresh-keeping device according to claim 11, wherein the electrolyte tank is detachably arranged on the inner frame through a first fixing structure, and the water tank is detachably arranged on the inner frame through a second fixing structure.

13. The fresh-keeping device according to claim 12, wherein the first fixing structure comprises:
  a first connecting column arranged on the side wall of the inner frame, wherein a first connecting hole is arranged in the first connecting column;
  a first stepped hole arranged at a corresponding position of the electrolyte tank, wherein the first connecting column passes through the first stepped hole; and
  a first fixed connecting member, wherein the first fixed connecting member passes through the first stepped hole and is threadedly connected to the first connecting hole.

14. The fresh-keeping device according to claim 12, wherein the second fixing structure comprises:
  a second connecting column arranged on the upper side wall of the inner frame, wherein a second connecting hole is arranged in the second connecting column;
  a second stepped hole arranged at a corresponding position of the water tank, wherein the second connecting column passes through the second stepped hole; and
  a second fixed connecting member, wherein the second fixed connecting member passes through the second stepped hole and is threadedly connected to the second connecting hole.

15. The fresh-keeping device according to claim 10, wherein a sealing strip is arranged between the opening and the drawer.

16. The fresh-keeping device according to claim 10, wherein a plurality of vent holes are provided, and the plurality of vent holes are arranged on the side wall of the frame in an array.

17. A refrigerator, comprising the fresh-keeping device according to claim 10.

* * * * *